April 9, 1946.

R. V. PUTERBAUGH ET AL 2,398,156

TESTING DEVICE

Filed Feb. 4, 1944

Inventors
RUSSEL V. PUTERBAUGH &
WILLIAM H. PUTERBAUGH JR.

By Carl Benst

Their Attorney

April 9, 1946.   R. V. PUTERBAUGH ET AL   2,398,156
TESTING DEVICE
Filed Feb. 4, 1944   2 Sheets-Sheet 2

Inventors
RUSSEL V. PUTERBAUGH &
WILLIAM H. PUTERBAUGH JR.
By
Their Attorney

Patented Apr. 9, 1946

2,398,156

UNITED STATES PATENT OFFICE 2,398,156

TESTING DEVICE

Russel V. Puterbaugh, Dayton, and William H. Puterbaugh, Jr., Centerville, Ohio, assignors to The National Cash Register Company, Dayton, Ohio, a corporation of Maryland Application February 4, 1944, Serial No. 521,034

6 Claims. (Cl. 73—9)

This invention relates to a device for determining friction characteristics of rotatable bearings, particularly ball bearings.

The torques required to rotate the outer raceway ring of a ball bearing relatively to the inner raceway ring are very small. The force used in testing the characteristics of a bearing must be such as to cause the relative motion between the two raceway rings to be continuous, increasing, or decreasing, in either a forward or a reverse direction, from a stationary condition or from any selected speed.

This invention discloses a testing device which includes a means for producing a rotating magnetic field by which a rotor is driven forwardly or reversely. The rotor is mounted on a support by means of the bearing to be tested. By adjusting the force of the magnetic field, its direction, the weight of the rotor, and the position of the axis of rotation, the bearing may be tested for friction and smoothness under various operating conditions including axial and radial loading. The assembly of the rotor and bearing on the support in relation to the field-producing means is such as to permit the bearings to be easily installed and removed.

Therefore it is an object of the invention to provide a bearing testing device which utilizes a rotating magnetic field.

Another object of the invention is to provide various controls for adjusting the torque and bearing load to simulate a wide range of operating conditions.

Another object of the invention is to provide a bearing tester wherein the bearing may be quickly mounted on and quickly removed from an axle by its inner raceway, its outer raceway supporting an easily removable rotor which is driven by a rotating magnetic field.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

General description

Figure 1:
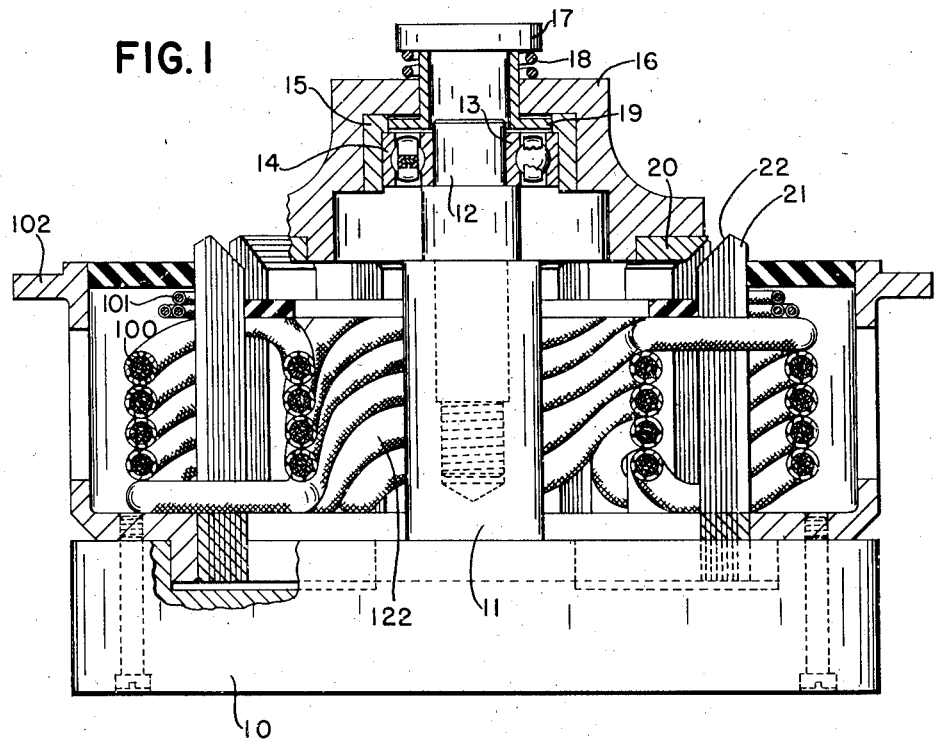
Fig. 1 is a partial cross section of the bearing tester on the line 1—1 of Fig. 2.
Figure 2:
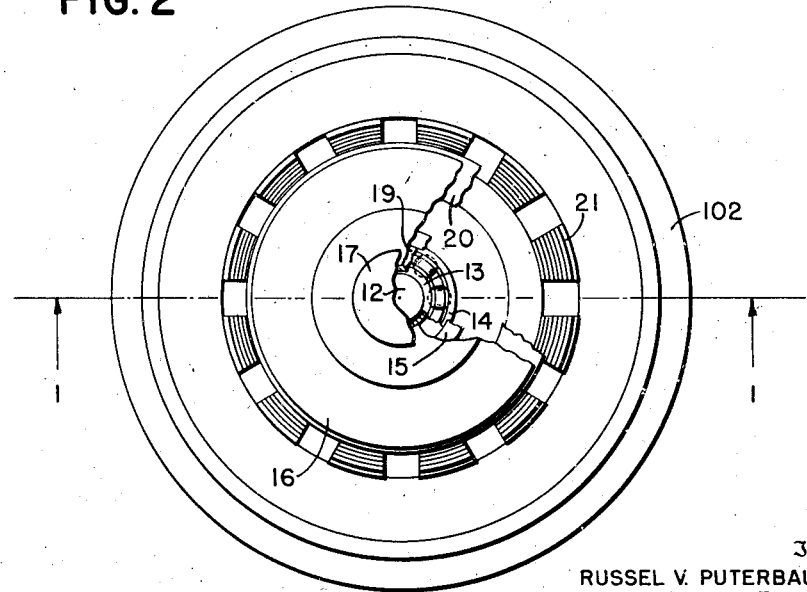
Fig. 2 is a plan view of the bearing tester, partly broken away.

Referring to Fig. 1, a circular base 10 has a central supporting column 11, into which is screwed a support 12, of a size to permit the inner raceway 13 of the bearing to be tested to be easily slipped thereover and gripped frictionally. The outer raceway 14 of the bearing is received into sleeve 15 and gripped frictionally. Sleeve 15 is securely fitted into a rotor 16, which rotor is made of any material suitable to provide the necessary weight load. The weight of the rotor is selected according to the weight load the bearings will take in use. A button 17, held by compression spring 18 in the position shown, is provided with flanges 19, so that the bearing under test may be pushed out of the rotor when the testing operation is finished. As shown in Fig. 1, the bearing, by reason of the weight of the rotor, has an axial load. If a bearing is to be tested under a radial load, the tester is placed in a horizontal position instead of the vertical position shown, thus causing the weight of the rotor to be directed radially on the bearing.

In the preferred embodiment of the invention, a hard steel ring 20 is fastened to the periphery of the rotor, to be acted upon by the rotating magnetic field, which is determined by the position of twelve laminated iron poles, such as pole 21, wound with electric coils such as coil 122. The poles, such as the pole 21, are formed of nested crenelated soft iron cylinders, the poles being chamfered as at 22 to parallel the chamfered periphery of the rotor ring 20.

Figure 3:
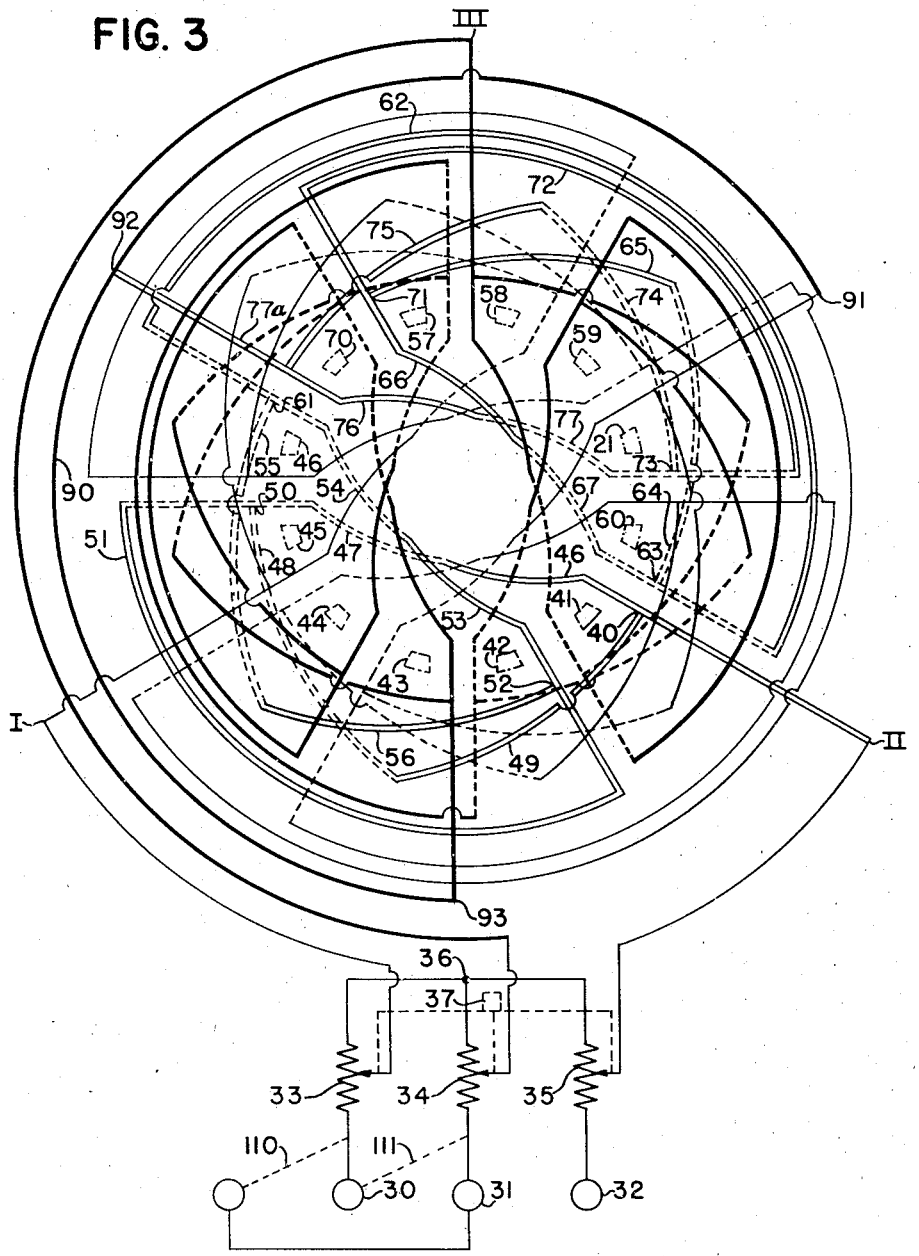
Fig. 3 is a circuit diagram of the rotating magnetic field windings.

Fig. 3 is a circuit diagram of a three-phase alternating current electric circuit energized from the three-phase source terminals 30, 31, and 32, connected through resistors 33, 34, and 35, respectively, to common point 36. A gang contact, operated by a common manipulative means 37, adjusts the contacts at selected equivalent points on the resistors to furnish three circuits constituting the energizing means for the rotating magnetic field. The circuits will be designated I, II, and III, and their entry points into the coils are so characterized in Fig. 3. Circuit I is denoted by a light line, circuit II is denoted by a double line, and circuit III is denoted by a heavy line. Circuit II will be traced as an example. Each circuit consists of four winding loops, each loop embracing a plurality of poles. From point 40, circuit II is coiled around poles 41, 42, 43, 44, and 45 with many turns to form the first loop, the path of the turns being traced as follows: 46, 47, 48, and 49. The dotted portion of the loop represents that it is overlain by superimposed loops of the other circuits. The second loop of circuit II embraces poles 42, 43, 44, 45, and 46 and is connected to the first loop from point 50, and over conductor 51, to loop point 52. This second loop is traced by lines 53, 54, 55, and 56. The third loop embraces poles 57, 58, 59, 21, and 60 and is connected to the second loop from point 61, and over conductor 62 to loop point 63. Loop three of circuit II is traced by lines 64, 65, 66, and 67. The fourth loop of circuit II embraces poles 70, 57, 58, 59, and 21 and is connected to the third loop from point 71 and over conductor 72 to loop point 73. The fourth loop is traced by lines 74, 75, 76, and 77. Conductor 77a connects the circuit II with conductor 90, common central connector of the circuits I, II, and III. Circuit I connects to conductor 90 at point 91, circuit II connects to conductor 90 at point 92, and circuit III connects to conductor 90 at point 93. Circuits I and III will not be traced as regards the loops around the poles, as they are of the same pattern as the loops of circuit II, but offset therefrom. It is seen that the patterns of the three circuits are offset, in relation to the circle described by the poles, by 120 degrees. The total effect of the loops and circuits of loops is to create a rotating magnetic field normal to the bearing axis. The strength of said rotating magnetic field may be adjusted by the gang contact operated by manipulative means 37.

The multiple coils in each loop may be characteristically seen at 100 in Fig. 1, and a conductor connecting two loops in one of the three circuits may be characteristically seen at 101. A casing 102 protects the coils from damage.

The rotor 16 is moved by the rotating field because the steel ring 20 has induced therein, by the rotating magnetic field, short persisting forces which produce a torque in the rotor tending to move it as the polarity of the field changes. The force of this torque may be varied by increase or decrease of the current in the described circuits through adjustment of the gang contacts described, and the force may be reversed by reversing the connections of any two wires of the three-phase circuit to the loop circuits I, II, and III, such a switching being shown by the dotted connections 110 and 111, Fig. 3.

Other types of rotors than the one shown, which works on the hysteresis principle, may be used. The steel ring rotor described gives rise to very low torque forces with ordinary current values and is preferred for that reason.

The bearing tester may be oriented in any manner to represent the actual working conditions in which the bearing under test will be used.

By bringing the bearing from a state of rest to a state of rotation and measuring the current necessary to start its movement and the time necessary to bring it to a given angular velocity, the static condition of the bearing may be measured. The current necessary to keep a constant ascertained speed of rotation is a way of testing the running characteristics. Reversal of the rotation often brings out defects in the bearings not ascertainable by unidirectional rotations. A standard bearing of proven satisfactory characteristics may be made the standard of time and current charts used in connection with the instrument.

The device, because of its construction, is particularly adapted for testing bearings rapidly, as the rotor is not confined in or fastened to the rest of the assembly but may be pulled off the support and the bearing replaced easily in a few seconds.

While the form of the device herein shown and described is admirably adapted to fulfill the objects primarily stated, it is to be understood that it is not intended to confine the invention to the one form or embodiment disclosed herein, for it is susceptible of embodiment in various forms all coming within the scope of the claims which follow.

What is claimed is:

1. In a testing device, the combination of a means to create a rotating magnetic field; an axle; means to mount the axle fixedly centrally within the field and normal to its path of rotation, said axle being formed on an end to receive and releasably grip the inner ring raceway of a ball bearing to be tested; and a disc-like metal piece having a central hole formed to receive and releasably grip the outer raceway ring of the ball bearing mounted on the axle so that the bearing may be easily and quickly changed, the periphery of said disc-like piece when mounted on the axle by means of the ball bearing being in the path of rotation of the magnetic field but free to be removed from the field-creating means, said disc-like piece constituting an armature.

2. In a testing device, in combination, means energizable to create a rotating magnetic field including a crenelated annular core with multiphased windings intertwined in the crenelations; means to energize said windings to create a rotary magnetic field in either direction around the annulus as selected; a fixed axle centered normally within the annular core and extending exteriorly thereof, said axle having a seat on the exterior end for releasably gripping the inner raceway ring of a ball bearing; and a rotor having a central hole for receiving and releasably gripping the outer raceway ring of a bearing seated on the axle, said rotor being shaped and positioned when embracing the bearing so that it will be rotated by the rotating magnetic field but free to be removed from the field-creating means.

3. In a testing device, the combination of a laminated creneiated annulus of metal; three electric circuits in the form of coils intertwiningly and overlappingly embracing the crenelations to create a rotating magnetic annular field when said coils are energized by a three-phase source of alternating current; a fixed axle centered in the annulus, which axle has a seat exteriorly of the annulus for releasably mounting thereon a ball bearing for rotation in a plane parallel with the plane of magnetic rotation; and a metal piece of circular shape having a hole in the center for receiving the free portion of the bearing in releasable engagement, said metal piece being rotatable on the bearing with its periphery within the rotating magnetic field but free from obstruction hindering its removal.

4. In a device for testing the internal friction of a bearing having inner and outer relatively moving parts, the combination of means to hold the inner part of the bearing stationary; a load disc of metal fixed centrally of the disc to the outer part of the bearing; and means to create a rotating magnetic field of adjustable strength and direction adjacent the periphery of the disc so as to urge the disc to rotate in either direction with a selected angular velocity, said field-creating means being positioned so as not to interfere with the rapid disassembly of the bearing from the holding means and disc for insertion of a new bearing to be tested.

5. In a testing device for testing the internal friction of bearings having relatively moving inner and outer parts, the combination of a standard on which the inner portion of the bearing under test is mounted so as not to rotate; a disc having a steel periphery acting as a load by the disc being engaged centrally with the outer portion of the bearing, so that the force necessary to rotate the disc reflects the internal friction of the bearing; and means to produce a rotary magnetic field around the standard in proximity to the periphery of the disc which urges the disc to rotate, said field-producing means being positioned so that it will not interfere with the removal or insertion of the bearing under test.

6. In a testing device, the combination of a means to create a rotating magnetic field; an axle; means to mount the axle fixedly centrally within the field and normal to its path of rotation, said axle being formed on an end to receive and releasably grip the inner ring raceway of a ball bearing to be tested; and a rotating type of armature having an axial hole formed to receive and releasably grip the outer raceway ring of the ball bearing mounted on the axle so that the bearing may be easily and quickly changed, the periphery of said armature when mounted on the axle by means of the bearing being in the path of rotation of the magnetic field but free to be removed from the field-creating means.

RUSSEL V. PUTERBAUGH.
WILLIAM H. PUTERBAUGH, JR.